United States Patent
Uchimoto (10) Patent No.: US 7,020,437 B2
(45) Date of Patent: Mar. 28, 2006

(54) RADIO COMMUNICATION SYSTEM AND FRAME SYNCHRONIZING METHOD BETWEEN BASE STATIONS

(75) Inventor: Toshihisa Uchimoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 578 days.

(21) Appl. No.: 09/987,256

(22) Filed: Nov. 14, 2001

(65) Prior Publication Data

US 2002/0177457 A1    Nov. 28, 2002

(30) Foreign Application Priority Data

May 25, 2001  (JP) .............................. 2001-157550

(51) Int. Cl.
*H04B 7/185*    (2006.01)

(52) U.S. Cl. ...................................... 455/13.2; 370/335

(58) Field of Classification Search ................ 455/502, 455/504, 500, 507, 439, 13.2; 370/335
See application file for complete search history.

(56) References Cited

U.S. PATENT DOCUMENTS 6,483,825 B1 * 11/2002 Seta ........................... 370/335

FOREIGN PATENT DOCUMENTS

| JP | 9-93186 | 4/1997 |
| JP | 10-84567 | 3/1998 |

* cited by examiner

*Primary Examiner*—Nick Corsaro
*Assistant Examiner*—Angelica M. Perez
(74) *Attorney, Agent, or Firm*—Oblon, Spivak, McClelland, Maier & Neustadt, P.C.

(57) ABSTRACT

Before the phase of a frame signal is adjusted according to a PPS signal, internal clocks operating according to a line clock are adjusted by absolute base stations based on a time matching signal transmitted from a maintenance terminal.

12 Claims, 6 Drawing Sheets

RADIO COMMUNICATION SYSTEM AND FRAME SYNCHRONIZING METHOD BETWEEN BASE STATIONS

BACKGROUND OF THE INVENTION

1. Field of the Invention

This invention relates to a radio communication system and a frame synchronizing method performed between base stations, designed to achieve excellent radio frame synchronization.

2. Description of the Related Art

Figure 5:
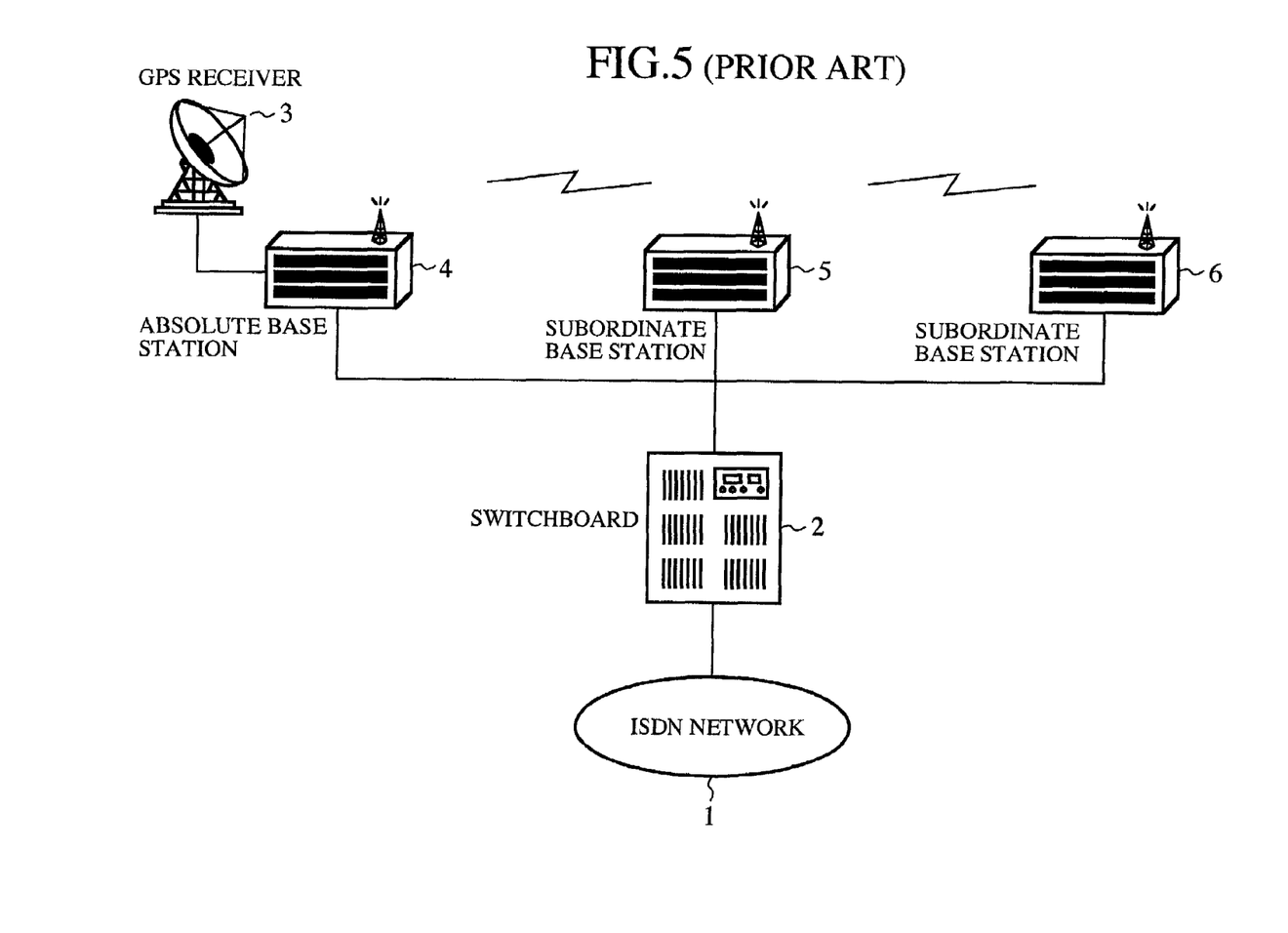
FIG. 5 is a configuration view showing a conventional radio communication system.

FIG. 5 is a schematic diagram showing a conventional radio communication system. In the drawing, a reference numeral 1 denotes a an ISDN network; 2 a switchboard; 3 a GPS (Global Positioning System) receiver for receiving a GPS reference signal (PPS signal) from a GPS satellite; 4 an absolute base station which adjusts the phase of a frame signal based on the PPS signal received by the GPS receiver 3 when a predetermined re-synchronization time is reached, and transmits the phase-adjusted frame signal to subordinate base stations 5 and 6; and 5 and 6 the subordinate base stations, each of which adjusts, upon reception of the frame signal from the absolute base station 4, the phase of an internal frame signal therein to coincide with the phase of the received frame signal.

Figure 6:
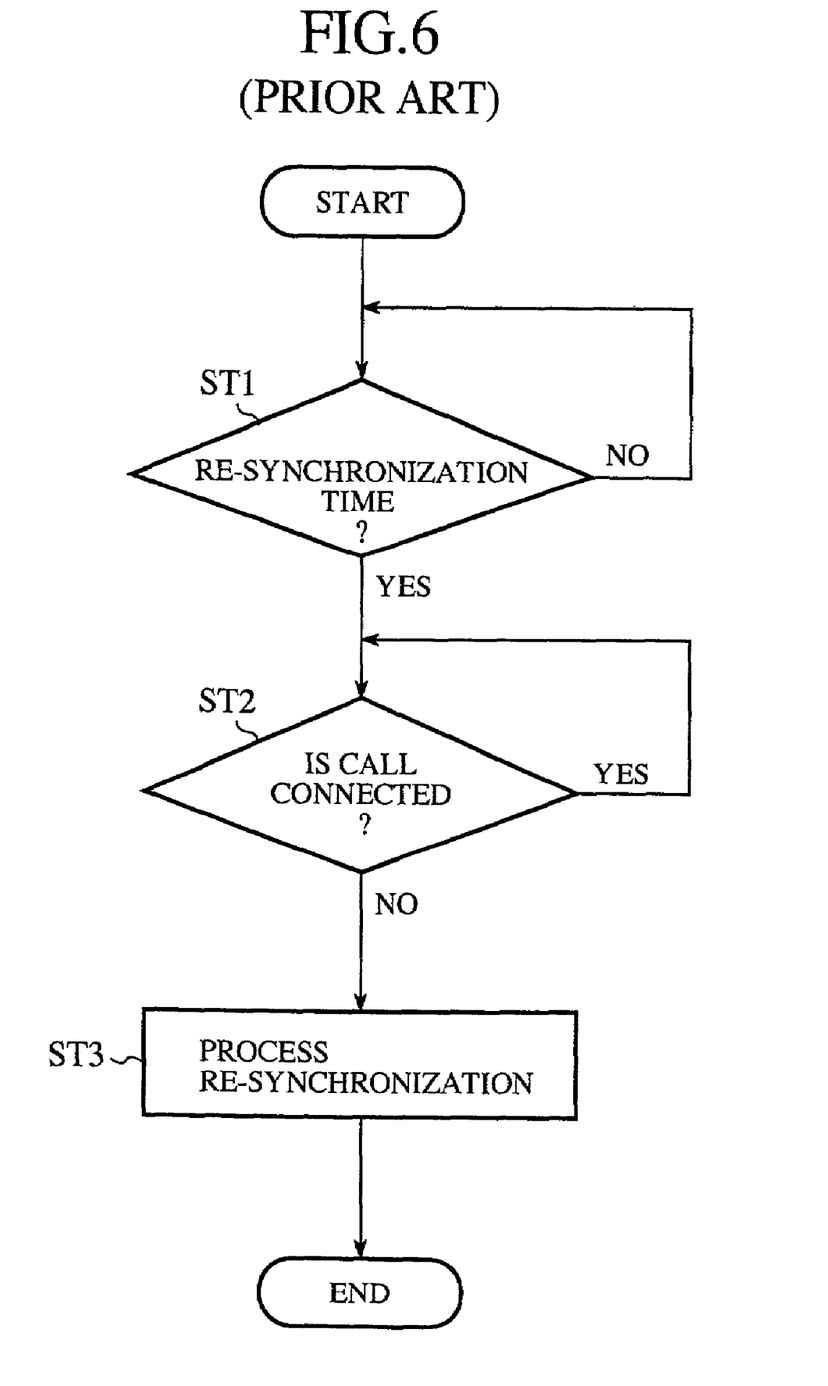
FIG. 6 is a flowchart showing a conventional frame synchronizing method between base stations.

FIG. 6 is a flowchart showing a conventional frame synchronizing method performed between base stations.

Next, an operation will be described.

The phase of a frame signal in the absolute base station 4, and the subordinate base stations 5, and 6 depends on a line clock transmitted from the ISDN network 1 through the switchboard 2. In other words, the phase of a frame signal is decided based on an internal clock operating according to the line clock.

Therefore, the synchronization of a frame signal is maintained as long as the absolute base station 4 and the subordinate base stations 5 and 6 use the same line clock.

However, if there is caused a discrepancy between the line clock and the PPS signal, an error is generated in the internal clocks at each of the absolute base station 4 and the subordinate base stations 5 and 6, thereby making it difficult to maintain the synchronization of the frame signal. Therefore, it is necessary to correct the internal clocks at regular intervals.

Thus, when a predetermined re-synchronization time is reached (step ST1), if a call is not in a connected state (step ST2), the absolute base station 4 corrects the error of the internal clock based on a PPS signal received each time by the GPS receiver 3, and adjusts the phase of a frame signal. In other words, the phase of a frame signal is adjusted such that the head of the frame signal can coincide with the rising edge of the PPS signal.

Upon reception of the phase-adjusted frame signal from the absolute base station 4, each of the subordinate base stations 5 and 6 adjust the phase of the internal frame signals thereof to coincide with the phase of the phase adjusted frame signal (step ST3).

If the call is in a connected state, processing is set to the standby mode until the call is disconnected, and once the call is disconnected, the phase of the frame signal is adjusted.

Because of the foregoing configuration of the conventional radio communication system, if the accuracy of the line clock is high, and the discrepancy between the line clock and the PPS signal is small, then the synchronization of a frame signal can be maintained even without correcting the error of the internal clock dependent on the line clock.

However, if the accuracy of the line clock is low, and the error of the internal clock is made large, then regarding the management of re-synchronization time of the absolute base station, no coincidence is reached among absolute base stations, making it impossible to perform simultaneous re-synchronization at the same time. Therefore, there has been such an inherent problem in the conventional art that the maintenance of the synchronization of a frame signal is not made possible.

Another problem inherent has been the impossibility of synchronizing the frame signal until the call is disconnected, if the call is in a connected state at the time of re-synchronization.

SUMMARY OF THE INVENTION

This invention has been made to solve the foregoing problems, and objects of the invention are to provide a radio communication system and a frame synchronizing method performed between base stations, whereby the synchronization of a frame signal can be maintained even if an error of the internal clock at absolute base stations is made large.

Other objects of the invention are to provide a radio communication system and a frame synchronizing method performed between base stations, whereby a fame signal is ensured to be synchronized at the time of re-synchronization.

In accordance with the invention, there is provided a radio communication system, which is constructed in such a manner that before the phase of a frame signal is adjusted according to a GPS signal, an absolute base station adjusts an internal clock operating according to a line clock based on a time matching signal transmitted from a maintenance terminal.

In accordance with the invention, there is provided a radio communication system, which is constructed in such a manner that when it is detected that a call has been generated before the predetermined re-synchronization time is reached, an absolute base station hands over the call to a subordinate base station.

According to the radio communication system of the invention, when the handing-over of the call to the subordinate base station fails, the absolute base station forcibly cuts the call.

According to the radio communication system of the invention, when the handing-over of the call to the subordinate base station fails, the absolute base station receives a frame signal from another absolute base station existing in the same area, and adjusts the phase of an internal frame signal to coincide with the phase of the thus received frame signal.

DETAILED DESCRIPTION OF THE PREFERRED EMBODIMENTS

Next, the preferred embodiments of the present invention will be described.

(First Embodiment)

Figure 1:
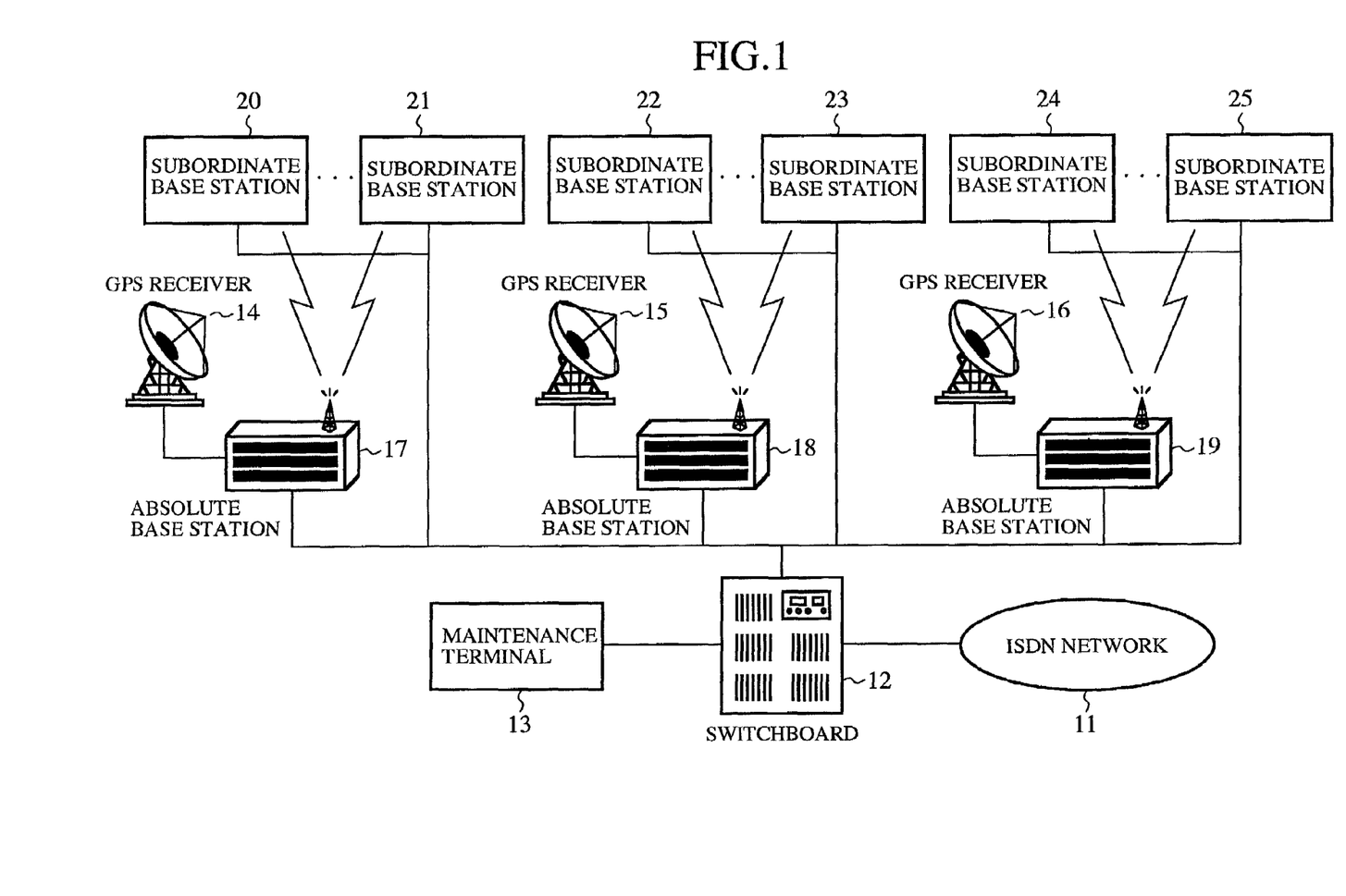
FIG. 1 is a schematic diagram showing a radio communication system according to a first embodiment of the present invention.

FIG. 1 is a schematic diagram showing a radio communication system according to a first embodiment of the invention. In the drawing, a reference numeral 11 denotes an ISDN network; 12 a switchboard; 13 a maintenance terminal for transmitting a time matching signal to absolute base stations 17 to 19 at a few minutes before re-synchronization time is reached; and 14 to 16 GPS receivers for receiving GPS reference signals (PPS signals) from a GPS satellite when the re-synchronization time is reached.

Reference numerals 17 to 19 denote absolute base stations, which adjusts internal clocks operating according to a line clock based on a time matching signal upon reception of the time matching signal from the maintenance terminal 13, and adjust the phase of a frame signal upon reception of a PPS signal from the GPS receivers 14 to 16, and thereafter transmit the phase-adjusted frame signal to subordinate base stations 20 to 25. Reference numerals 20 to 25 denote subordinate base stations each of which adjusts the phase of an internal frame signal to coincide with the phase of the frame signal sent from the absolute base stations 17 to 19 upon reception.

Figure 2:
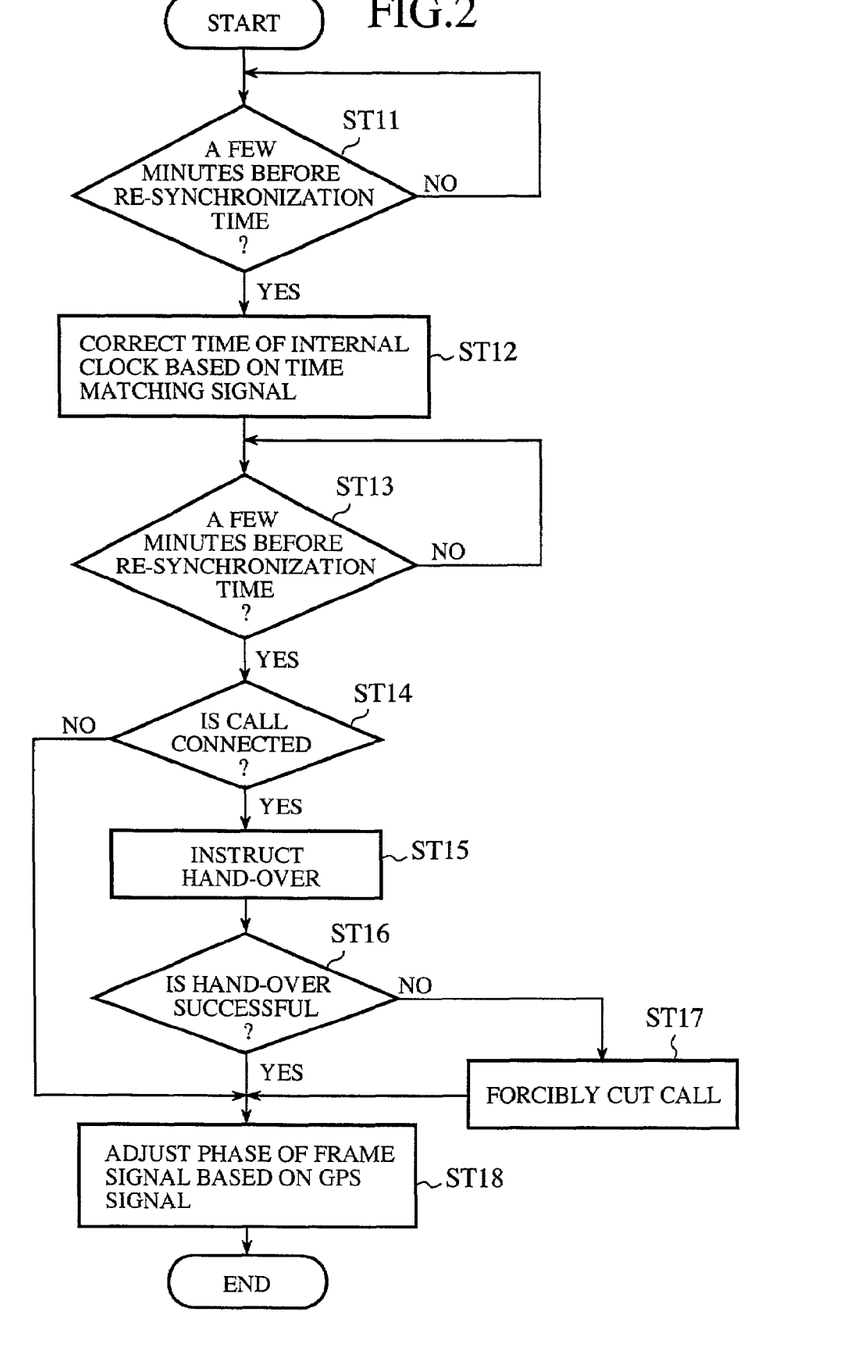
FIG. 2 is a flowchart showing a frame synchronizing method between base stations according to the first embodiment of the invention.

FIG. 2 is a flowchart showing a frame synchronizing method performed between base stations according to the first embodiment of the invention.

Next, an operation will be described.

First, at a few minutes before re-synchronization time is reached (step ST11), the maintenance terminal 13 transmits a time matching signal to the absolute base stations 17 to 19 through the switchboard 12 in order to correct an error of each of the internal clocks in the respective absolute base stations 17 to 19. For example, if the re-synchronization time has been set at 3:00 by a setting parameter, a time matching signal indicating that current time is "2:30" is transmitted at 2:30.

Upon reception of the time matching signal from the maintenance terminal 13, the absolute base stations 17 to 19 correct their own internal clocks according to the thus received time matching signal.

Then, just as the case of the absolute base stations 17 to 19, the subordinate base stations 20 to 25 also correct the time of their own internal clocks upon reception of the time matching signal from the maintenance terminal 13 (step ST12).

Subsequently, at a few seconds before the re-synchronization time is reached (step ST13), the GPS receivers 14 to 16 receive a PPS signal from the GPS satellite. The PPS signal is received per each second.

If a call is not in a connected state (step ST 14), the absolute base stations 17 to 19 adjust the phase of a frame signal based on the PPS signal received by the GPS receivers 14 to 16 after the correction of the internal clocks thereof conducted based on the matching signal. In other words, the phase of a frame signal is adjusted such that the head of the frame signal can coincide with the rising edge of the PPS signal.

Then, after the absolute base stations 17 to 19 have transmitted the phase-adjusted frame signal, the subordinate base stations 20 to 25 respectively adjust the phase of an internal frame signal to coincide with the phase of the frame signal (step ST18).

However, when the call is in a connected state, the absolute base stations 17 to 19 hand over the call to any of the subordinate base stations to enable the phase adjustment of the frame signal to be executed (step ST15). In other words, the handing-over of the call is executed to one of the subordinate base stations 20 to 25, in which the call can be set.

If the handing-over of the call is successful (ST16), the process immediately moves to step ST18. If the handing-over of the call fails (ST16), the call is forcibly cut (ST17), and then the process moves to step ST18.

As apparent from the foregoing, according to the first embodiment, since before the phase of the frame signal is adjusted according to a PPS signal, the absolute base stations 17 to 19 adjust the internal clocks thereof operating in accordance with the line clock on the basis of the time matching signal transmitted from the maintenance terminal 13, even if an error of each of the internal clocks in the respective absolute base stations 17 to 19 is made large, it is still possible to maintain the synchronization of the frame signal.

Furthermore, according to the first embodiment, when it is detected that a call has been generated before the predetermined re-synchronization time is reached, the absolute base stations 17 to 19 hand over the call to any of the subordinate base stations, whereby the synchronization of a frame signal is ensured at the time of re-synchronization.

(Second Embodiment)

The foregoing first embodiment has been explained as to the case where when the handing-over of a call from the absolute base station to the subordinate base station fails, the absolute base station forcibly cuts the call. However, the following may be executed.

Figure 3:
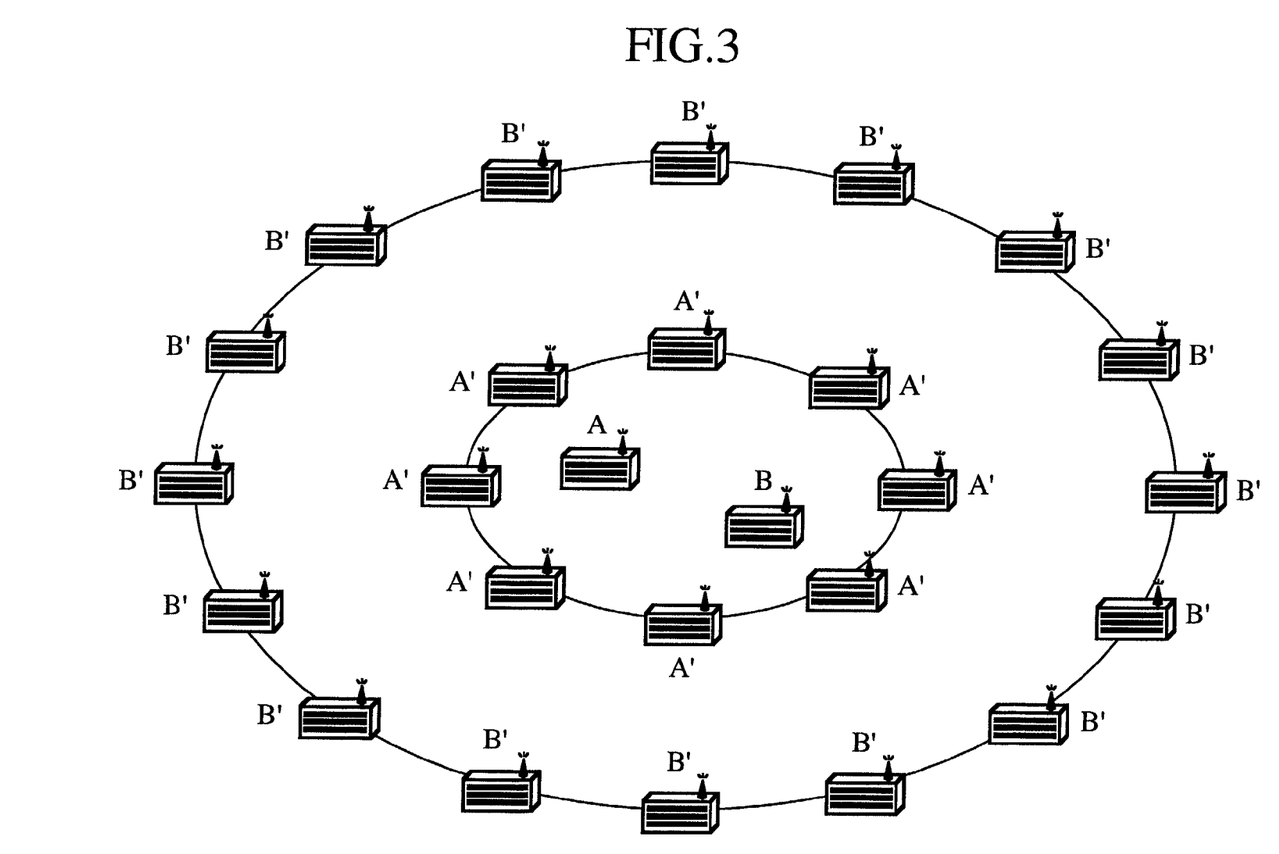
FIG. 3 is a configuration view showing a radio communication system according to a second embodiment of the invention.
Figure 4:
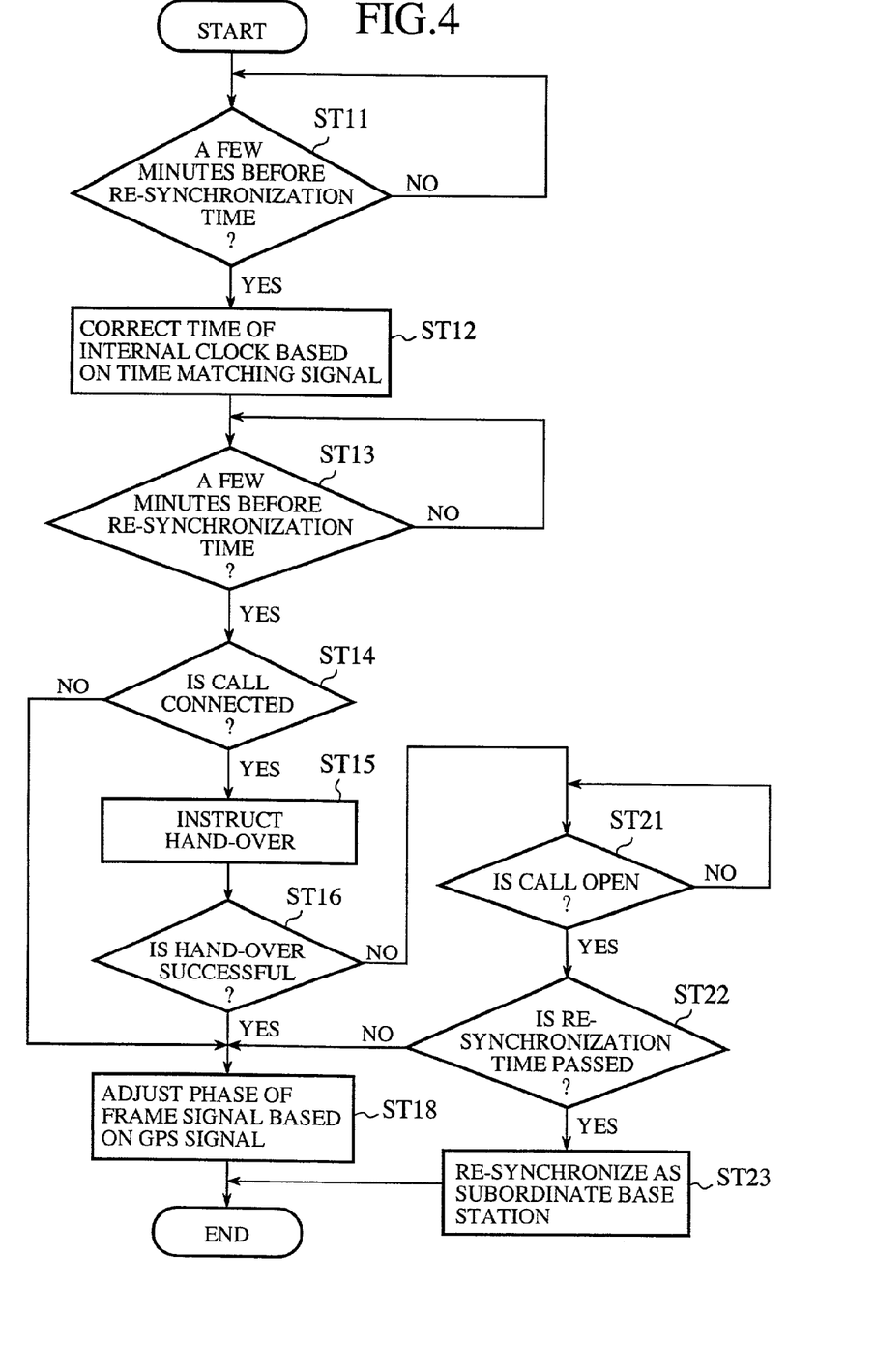
FIG. 4 is a flowchart showing a frame synchronizing method between base stations according to the second embodiment of the invention.

Specifically, as shown in FIG. 3, assuming that a plurality of absolute base stations A and B exist in the same area, when a handing-over from one absolute base station A to any one of the subordinate base stations A' fails, the absolute base station A is set to a standby mode to wait for the release of the call. If the re-synchronization time has not been passed when the call is released, as in the case of the first embodiment, the phase of the frame signal is adjusted according to a PPS signal (steps ST21, ST22, and ST18 of FIG. 4). On the other hand, if the re-synchronization time has already passed, the absolute base station A receives a frame signal from another absolute base station B, just as the case in which a subordinate base station B' receives a frame signal from the base station B, and adjusts the phase of an internal frame signal to coincide with the phase of the frame signal received from the absolute base station B (step ST23).

As described above, according to the invention, before the phase of the frame signal is adjusted according to the GPS signal, an absolute base station adjusts the internal clock operating in accordance with the line clock based on the time matching signal transmitted from the maintenance terminal. Thus, it is possible to maintain the synchronization of the frame signal even if an error of each of the internal clocks in the respective absolute base stations is made large.

According to the invention, when it is detected that a call has been generated before the pre-determined re-synchronization time is reached, the absolute base station hands over the call to the subordinate base station. Thus, the synchronization of a frame signal is ensured at the time of re-synchronization.

According to the invention, when the handing-over of the call to the subordinate base station fails, the absolute base station forcibly cuts the call. Thus, even if the call handing-over fails, the synchronization of the frame signal is ensured at the time of re-synchronization.

According to the invention, when the handing-over of the call to subordinate base station fails, the absolute base station receives a frame signal from another absolute base station existing in the same area, and adjusts the phase of the internal frame signal to coincide with the phase of the received frame signal. Thus, even if the handing-over fails, the synchronization of a frame signal is ensured at the time of re-synchronization.

As apparent from the foregoing, the advantages of the present invention can be summarized as follows.

Before the phase of a frame signal is adjusted on the basis of the GPS signal, the absolute base station adjusts the internal clock operating according to the line clock on the basis of the time matching signal transmitted from the maintenance terminal. Thus, even if an error of the internal clock of the absolute base station is made large, it is still possible to maintain the synchronization of the frame signal.

When it is detected that a call has been generated before the predetermined re-synchronization time is reached, the absolute base station hands over the call to the subordinate base station. Thus, the synchronization of a frame signal is ensured at the time of re-synchronization.

When the handing-over of the call to the subordinate base station fails, the absolute base station forcibly cuts the call. Thus, even if the call handing-over fails, the synchronization of a frame signal is ensured at the time of re-synchronization.

When the handing-over of the call to the subordinate base station fails, the absolute base station receives a frame signal from another absolute base station present in the same area, and adjusts the phase of the internal frame signal to coincide with the phase of the received frame signal. Thus, even if the call handing-over fails, the synchronization of a frame signal is ensured at the time of re-synchronization.

What is claimed is:

1. A radio communication system, comprising:
a maintenance terminal;
a first base station configured to adjust the phase of a frame signal according to a GPS signal when a predetermined re-synchronization time is reached, and transmits the frame signal; and
a subordinate base station which, upon reception of the frame signal from said first base station, is configured to adjust the phase of an internal frame signal to coincide with the received phase of the frame signal,
wherein said first base station is further configured to adjust an internal clock operating according to a line clock based on a time matching signal transmitted from said maintenance terminal, said time matching signal being transmitted before the adjustment of the phase of the frame signal according to the GPS signal is performed.

2. The radio communication system, comprising:
a first base station configured to adjust the phase of a frame signal according to a GPS signal when a predetermined re-synchronization time is reached, and transmits the frame signal; and
a subordinate base station which, upon reception of the frame signal from said first base station, is configured to adjust the phase of an internal frame signal to coincide with the received phase of the frame signal,
wherein if the first base station detects that a call has been generated before the predetermined re-synchronization time is reached, said first base station is configured to hand over the call to said subordinate base station.

3. The radio communication system according to claim 2, wherein when the handing-over of the call to said subordinate base station fails, said first base station is configured to forcibly cut the call.

4. The radio communication system according to claim 2, wherein when the handing-over of the call to said subordinate base station fails, said first base station is configured to receive a frame signal from another base station existing in the same area, and is further configured to adjust the phase of the internal frame signal to coincide with the phase of the thus received frame signal.

5. A method for radio communication comprising:
adjusting, at a first base station, a frame signal phase according to a GPS signal when a predetermined re-synchronization time is reached, and transmitting the frame signal to a subordinate base station;
adjusting, at a subordinate base station, an internal frame signal phase when the frame signal from said first base station is received, to coincide with the received phase of the frame signal; and
adjusting a first base station internal clock according to a line clock, based on a time matching signal transmitted from a maintenance terminal, said time matching signal being transmitted before the adjustment of the phase of the frame signal according to the GPS signal is performed.

6. The method of claim 5, further comprising:
handing-over a call from the first base station to the subordinate base station, if the first base station detects that a call had been generated before the predetermined re-synchronization time was reached.

7. A method of radio communication according to claim 6, further comprising:
forcibly cutting the call at the first base station, if a hand-over of the call from the first base station to the subordinate base station fails.

8. A method of radio communication according to claim 6, further comprising:
receiving, at the first base station, a frame signal from another base station existing in the same area, and adjusting the phase of the first base station frame signal to coincide with a phase of the thus received frame signal, if a hand-over of the call from the first base station to the subordinate base station fails.

9. A base station connected to at least one subordinate base station via a radio communication system, comprising:
means for adjusting a frame signal phase according to a GPS signal when a predetermined re-synchronization time is reached, and transmitting the frame signal to the at least one subordinate base station; and
means for adjusting an internal clock according to a line clock, based on a time matching signal transmitted from a maintenance terminal, said time matching signal being transmitted before the adjustment of the phase of the frame signal according to the GPS signal is performed.

10. A base station connected to at least one subordinate base station via a radio communication system, comprising:
means for adjusting a frame signal phase according to a GPS signal when a predetermined re-synchronization time is reached, and transmitting the frame signal to the at least one subordinate base station; and means for adjusting an internal clock according to a line clock based on a time matching signal transmitted from a maintenance terminal, said time matching signal being transmitted before the adjustment of the phase of the frame signal according to the GPS signal is performed; and means for handing-over a call to the at least one subordinate base station if the base station detects that the call had been generated before the predetermined re-synchronization time was reached.

11. A base station according to claim 10, further comprising:

means for forcibly cutting the call if a hand-over of the call from the base station to the at least one subordinate base station fails.

12. A base station according to claim 10, further comprising:

means for receiving a frame signal from another base station existing in the same area, and adjusting the phase of the base station frame signal to coincide with a phase of the thus received frame signal if a hand-over of the call from the base station to the at least one subordinate base station fails.

* * * * *